US012653198B2

(12) United States Patent
Cox et al.

(10) Patent No.: US 12,653,198 B2
(45) Date of Patent: *Jun. 16, 2026

(54) APPARATUS AND METHOD FOR PRODUCING SCORED DOUGH PIECES

(71) Applicant: General Mills, Inc., Minneapolis, MN (US)

(72) Inventors: Steven J. Cox, Long Lake, MN (US); Kara M. Hobart, New Hope, MN (US); Todd A. Rasmussen, Scandia, MN (US)

(73) Assignee: General Mills, Inc., Minneapolis, MN (US)

( * ) Notice: Subject to any disclaimer, the term of this patent is extended or adjusted under 35 U.S.C. 154(b) by 53 days.

This patent is subject to a terminal disclaimer.

(21) Appl. No.: 18/666,956

(22) Filed: May 17, 2024

(65) Prior Publication Data

US 2024/0298652 A1 Sep. 12, 2024

Related U.S. Application Data

(63) Continuation-in-part of application No. 17/719,943, filed on Apr. 13, 2022, now Pat. No. 12,408,675.

(51) Int. Cl.

| | |
|---|---|
| *A21C 11/04* | (2006.01) |
| *A21C 5/08* | (2006.01) |
| *A21C 11/10* | (2006.01) |
| *A21C 11/12* | (2006.01) |
| *A21D 6/00* | (2025.01) |

(52) U.S. Cl.
CPC ................ *A21C 11/04* (2013.01); *A21C 5/08* (2013.01); *A21C 11/10* (2013.01); *A21C 11/12* (2013.01); *A21D 6/001* (2013.01)

(58) Field of Classification Search
None
See application file for complete search history.

(56) References Cited

U.S. PATENT DOCUMENTS

| | | | |
|---|---|---|---|
| 2,887,964 | A | 5/1959 | Griner |
| 3,225,717 | A | 12/1965 | Page |
| 3,765,909 | A | 10/1973 | Moline |
| 4,246,838 | A | 1/1981 | Pulver et al. |
| 4,276,800 | A | 7/1981 | Koppa et al. |
| 4,469,476 | A | 9/1984 | Cavanagh et al. |
| 4,650,687 | A | 3/1987 | Willard et al. |
| 5,349,759 | A | 9/1994 | Anton et al. |
| 5,935,629 | A | 8/1999 | Martin |

| | | | |
|---|---|---|---|
| 6,783,782 | B1 | 8/2004 | Larsen et al. |
| 6,902,754 | B1 | 6/2005 | Evans et al. |
| 8,535,039 | B2 | 9/2013 | Evans et al. |
| 10,238,119 | B2 | 3/2019 | Evans et al. |
| 2003/0024360 | A1 | 2/2003 | Ribble |
| 2004/0197454 | A1 | 10/2004 | Henry et al. |
| 2005/0031733 | A1 | 2/2005 | Domingues et al. |
| 2005/0129821 | A1 | 6/2005 | Goedeken et al. |
| 2007/0178208 | A1 | 8/2007 | Moidl et al. |
| 2008/0289466 | A1 | 11/2008 | Takama et al. |
| 2010/0159095 | A1 | 6/2010 | Suski et al. |
| 2010/0173052 | A1 | 7/2010 | Suski et al. |
| 2011/0177190 | A1 | 7/2011 | Evans et al. |
| 2018/0289021 | A1 | 10/2018 | Zorn |
| 2019/0307135 | A1 | 10/2019 | Gottenbusch et al. |
| 2019/0357549 | A1 | 11/2019 | Crosby et al. |
| 2021/0235709 | A1 | 8/2021 | Cox et al. |

FOREIGN PATENT DOCUMENTS

| | | |
|---|---|---|
| CA | 3103810 | 1/2020 |
| DE | 19549762 | 7/2007 |
| FR | 1114890 | 4/1956 |
| FR | 2666490 | 3/1992 |
| WO | WO 2004/037003 | 5/2004 |
| WO | WO 2004/039163 | 5/2004 |
| WO | WO 2015/160238 | 10/2015 |
| WO | WO 2021/158293 | 12/2020 |

OTHER PUBLICATIONS

Hagedon, "Equipment Overview: A Complete Production Line for Artisan Bread", Naegele Inc. Bakery Systems, Retrieved from the Internet: naegele-inc.com/2018/10/31/equipment-overview-a-complete-production-line-for-artisan-bread, Year: 2018, 10 pages.
Ruth, "*Scoring Bread*", Cook Til Delicious, Retrieved from the Internet: https://cooktildelicious.com/scoring-bread, May 16, 2017.
J4 Tunnel Ovens, "*Baguette Line, Tray System*", Retrieved from the Internet: URL:https://www.youtube.com/watch?v=tmr12pEBfkg, Feb. 26, 2021.

*Primary Examiner* — Jyoti Chawla
(74) *Attorney, Agent, or Firm* — Jordan IP Law, LLC; Tina Yin Sowatzke, Esq.

(57) ABSTRACT

Frozen un-proofed dough pieces are produced by cutting a dough sheet into strips and producing a score through an upper skin of each strip with at least one blunt deformation tool prior to freezing. The un-proofed dough pieces are formed by mass production, with an un-proofed dough sheet being cut to form dough strips which are then cut into the un-proofed dough pieces, with the score for each un-proofed dough piece being formed by pressing the upper skin of the dough down into the body of the dough, thereby deforming and pre-stressing the dough to create weak zones, either before, during or after the individual un-proofed dough pieces are actually created, but before freezing. Upon heating, openings are established in the upper skin along score lines.

19 Claims, 7 Drawing Sheets

APPARATUS AND METHOD FOR PRODUCING SCORED DOUGH PIECES

CROSS-REFERENCE TO RELATED APPLICATIONS

This application represents a continuation-in-part of U.S. patent application Ser. No. 17/719,943, filed Apr. 13, 2022, entitled "Apparatus and Method for Producing Scored Dough Pieces", pending. The entire content of this application is incorporated herein by reference.

BACKGROUND OF THE INVENTION

The present invention pertains to the art of food production and, more particularly, to the automated production of bread products. Bakery operators sometimes purchase frozen un-proofed bread dough, which they thaw, proof and bake prior to sale. Depending on the desired bread product, the bread dough may be manually scored after proofing and before baking to help control expansion during baking and to give the resulting bread product its traditional look. That is, by scoring after proofing, the dough is allowed to fully expand during the proofing process in an intact form and the scores are then provided in a decorative pattern just before baking to enable oven expansion in controlled regions. However, manually scoring each dough piece is time consuming and can actually represent an operational challenge. With this in mind, it would be beneficial to bakery operators if the frozen un-proofed dough already included a score. However, the changes that dough undergoes during proofing makes it difficult to utilize pre-proof scoring in a consistent manner, particularly for a commercial dough producing operation.

SUMMARY OF THE INVENTION

The present invention successfully achieves the goal of scoring bread dough before purchase by bakery operators by employing deformation scoring. That is, a blunt deformation tool is employed to deform the dough, either before, after or simultaneously with a dough cutting operation, to pre-stress the dough in scoring regions to establish weak zones which open up along score lines upon cooking the dough. In accordance with preferred embodiments of the invention, after cutting and deformation scoring, the dough is frozen. More particularly, un-proofed dough pieces with scores are produced by directing a dough sheet along a conveyor with a lower skin of the dough sheet contacting the conveyor and an upper skin being spaced from the lower skin. At least one cutter cuts the dough sheet into separate dough strips. In one form of the invention, a series of rotating, circular blunt-edge dough cutters creates a series of strips entirely by pressing the upper skin toward the lower skin to pinch the upper and lower skins together while cutting. This technique stretches the upper skin of the dough as it is drawn toward the lower skin and pinches the two surfaces together as the dough is cut to form dough strips or pieces. Regardless of the type of dough cutters used to establish the strips, a blunt deformation tool is employed in accordance with the invention for the purpose of establishing one or more score lines in a respective strip upon cooking of the dough. Importantly, no actual cutting or slicing of the dough is performed for the scoring in accordance with the invention. Instead, a blunt deformation tool is used to pre-condition the dough in creating a functional score by pressing against and drawing the upper skin to a depth in a body of the dough above the lower skin. After the deformation tool is no longer pressing on the dough, the dough actually rebounds or re-expands in the scoring region(s) while weak zones are established. The strips are cut into pieces which can be frozen and then later baked to make loaves of bread. It has been found that such a created score pre-stresses the dough in such a way that the dough stays intact while the dough piece goes through the proofing process but still causes a desired split to open when the piece is baked.

In certain preferred forms of the invention, both the cutting of strips and the scoring are performed by a plurality of alternating blades and wheels fixed to a common driveshaft. In another embodiment, the scoring is performed by a plurality of wheels fixed to a first driveshaft, and the cutting (blunt-edge or otherwise) is performed by a plurality of blades fixed to a second driveshaft, with the first driveshaft located either upstream or downstream, i.e., longitudinally offset along the conveyor, of the second driveshaft. In accordance with this embodiment, the first driveshaft can be adjusted in the vertical direction to enable the plurality of wheels to create discontinuous scoring depressions or varying depth depressions along a longitudinal line by selectively raising or lowering the first driveshaft.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Figure 1:
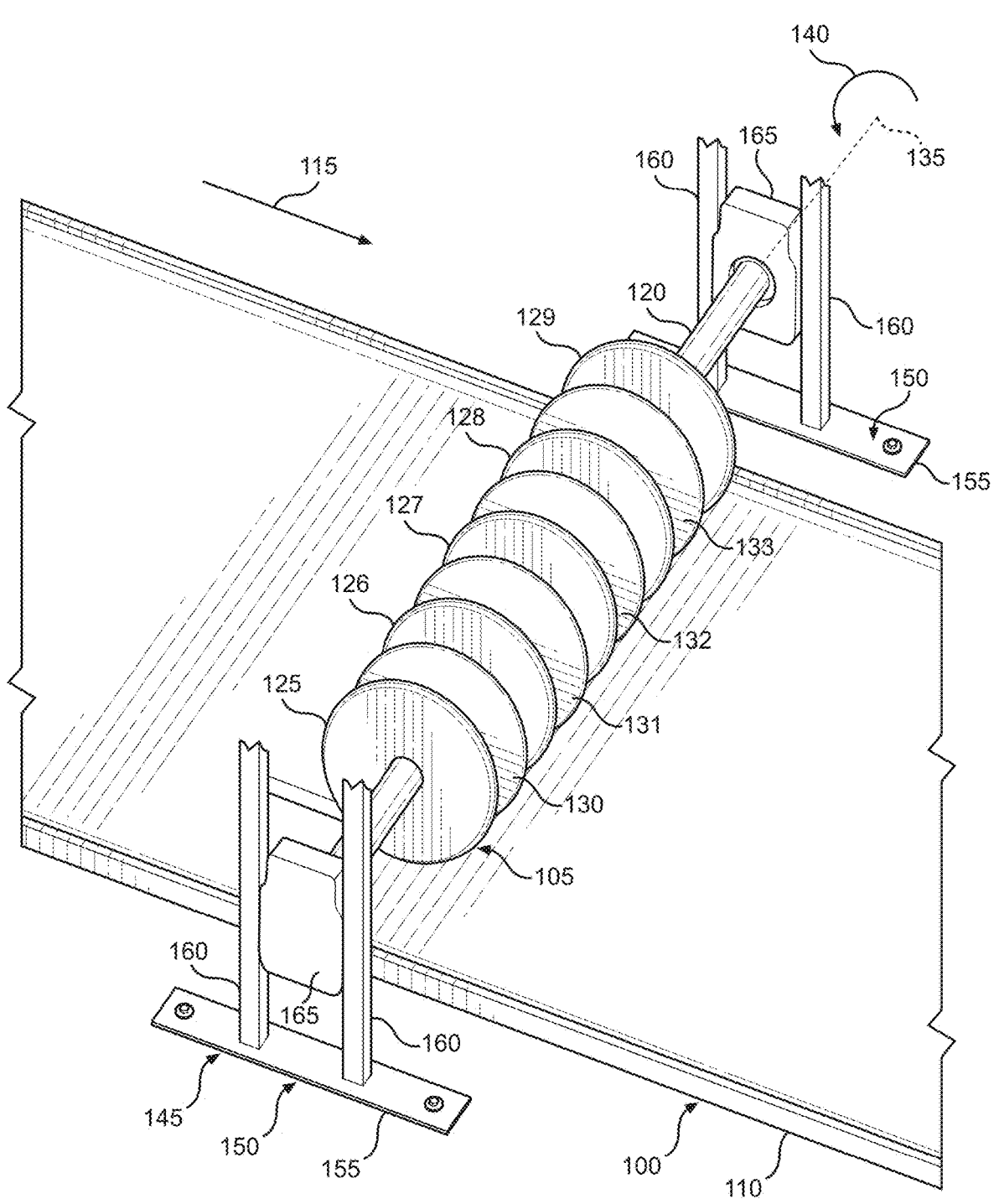
FIG. 1 is a perspective view of a portion of a production line for producing dough pieces in accordance with the present invention.

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. Additionally, as used in connection with the present invention, terms such as "parallel", "perpendicular", "vertical", "upper", "lower" and the like do not necessarily require, for example, that the relevant items be perfectly parallel. Instead, these terms constitute general, relative directional terms which can vary within a reasonable margin of error or perspective so long as the error does not prevent the present invention from functioning as intended.

As discussed above, it would be desirable to provide bread dough that is scored before delivery to bakery operators, preferably in a frozen un-proofed state. However, attempts have shown that it can prove difficult to automate scoring of un-proofed dough pieces prior to freezing in a manner that consistently produces the desired end result upon baking. The present invention successfully achieves this goal in a simplified manner basically by performing the scoring of bread dough with a dough deformation technique that stretches the upper skin of dough to establish an elongated depression which, although significantly rebounding due to elasticity of the dough, pre-stresses the dough so as to establish a weak zone along the score line, with the dough splitting at the weak zone during baking to establish a desirable color differentiation between an outer crust and the exposed inner body in the region of the score.

Various dough cutting approaches are described in U.S. Pat. No. 6,902,754, for example, which is incorporated herein by reference. This patent discloses a cutter including a blunt-edge dough-cutting or dough-engaging surface that is configured to draw a first or upper surface or skin of a dough toward a second or lower surface or skin of the dough when the cutter is impinged on the dough. The various dough cutting techniques described in U.S. Pat. No. 6,902,754 can be more generally referred to herein as "blunt-edge" cutting. Basically, this technique does not actually cut the dough in a conventional slicing operation as the cutting tool is blunt, but rather stretches the upper skin of the dough as it is drawn toward the lower skin and pinches the two surfaces together in cutting the dough to form dough strips or pieces. This advantageously results in a dough product that has rounded dimensions and more closely resembles a hand-formed dough product than dough cut by traditional techniques. Although not a required cutting technique in accordance with the overall invention, blunt-edge cutting of the dough into strips or pieces is preferred for the reasons mentioned above and will be described hereinafter in reference to exemplary embodiments of the invention.

It has been discovered that establishing a score by pushing down the upper skin of the un-proofed dough prior to freezing results in an internal weak zone, resulting in a scored dough product with functional attributes comparable to dough products that are scored after proofing. Although there are multiple ways to cut a dough sheet into strips or pieces in accordance with the overall invention, scoring of the strips or pieces specifically employs blunt deformation technology, with the scoring being performed, from a manufacturing standpoint, just before, immediately after or at substantially the same time as cutting the dough into pieces.

With reference to FIG. 1, an embodiment of the present invention is shown where blunt-edge cutting is employed, with the blunt-edge cutting and deformation scoring taking place simultaneously. Specifically, FIG. 1 shows a portion of a production line including a conveyor system 100 and a combination rotary dough cutter and scoring unit 105.

Conveyor system 100 includes a conveyor belt 110 for supporting and transporting a dough sheet (not shown in FIG. 1). However, other conveyor arrangements known in the art can be used with the present invention. As shown, conveyor belt 110 passes beneath rotary dough cutter and scoring unit 105 while traveling in a direction 115.

Rotary dough cutter and scoring unit 105 includes a driveshaft 120, a plurality of circular blades 125-129 and a plurality of wheels 130-133. Driveshaft 120 is aligned perpendicular to direction 115. Accordingly, the axis of rotation 135 for rotary dough cutter and scoring unit 105 is also aligned perpendicular to direction 115. Rotary dough cutter and scoring unit 105 is configured such that contact between blades 125-129 and conveyor belt 110, or a dough sheet supported by conveyor belt 110, causes rotary cutter 105 to rotate in a direction 140 as conveyor belt 110 travels in direction 115. Alternatively, a motor and transmission (not shown) can be provided for driving rotary dough cutter and scoring unit 105, i.e., for causing rotary dough cutter and scoring unit 105 to be positively driven to rotate in direction 140.

Blades 125-129 and wheels 130-133 are fixedly coupled to driveshaft 120 such that rotation of driveshaft 120 results in rotation of blades 125-133. Each of blades 125-129 is configured to cut and each of wheels 130-133 is configured to score a dough sheet being transported by conveyor belt 110. Specifically, blades 125-129 are blunt-edge blades or other circular cutters and are configured to cut the dough sheet into dough strips, while wheels 130-133 are specifically configured to not cut or slice the dough sheet but rather uniquely score the dough sheet. For purposes of the present invention, "cutting" (and its variants) means that the dough is cut all the way through. This can be done in various ways, including cutting by pinching, as described above in connection with blunt-edge cutters, or cutting by slicing as done with sharp edge cutters. "Scoring" (and its variants) means that the dough is deformed only part of the way through. Specifically for purposes of this invention, "scoring" does not encompass "cutting" or "slicing" of the dough but rather "deforming" or "creasing" the dough is performed as will become more fully evident below. Also, while a select number of blades and wheels are shown across driveshaft 120, other numbers of blades and interposed wheels can be used depending on the width of the dough sheet and the desired width of the resulting dough strips.

Rotary dough cutter and scoring unit 105 is supported above conveyor belt 110 by a support structure 145. The details of support structure 145 are not important to the present invention. However, it can be seen that support structure 145 includes identical left and right supports 150. Each support 150 has a base 155 and a pair of columns 160, supporting a housing 165, which can incorporate a drive motor. Housings 165 receive the ends of driveshaft 120 to facilitate rotation of rotary cutter 105.

Figure 2A:
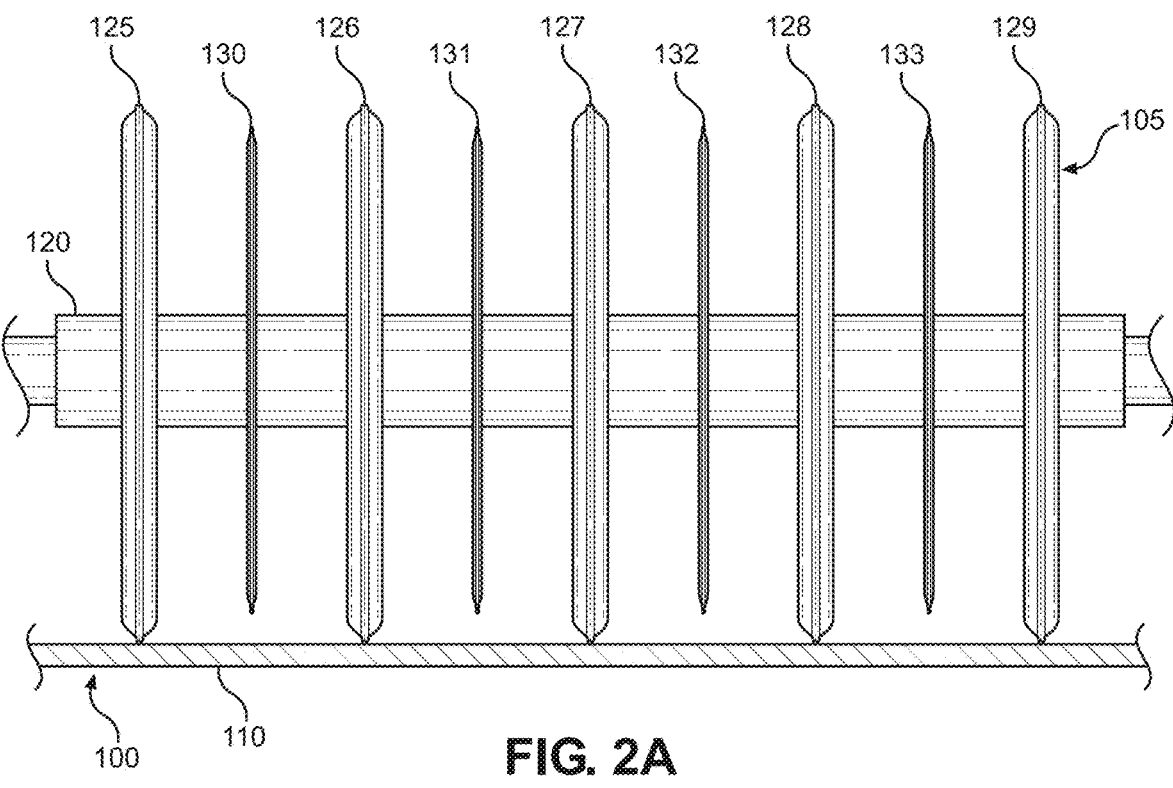
FIG. 2A is a front view of a conveyor belt and combination rotary cutter and scorer unit of the production line without a dough sheet in place.
Figure 2B:
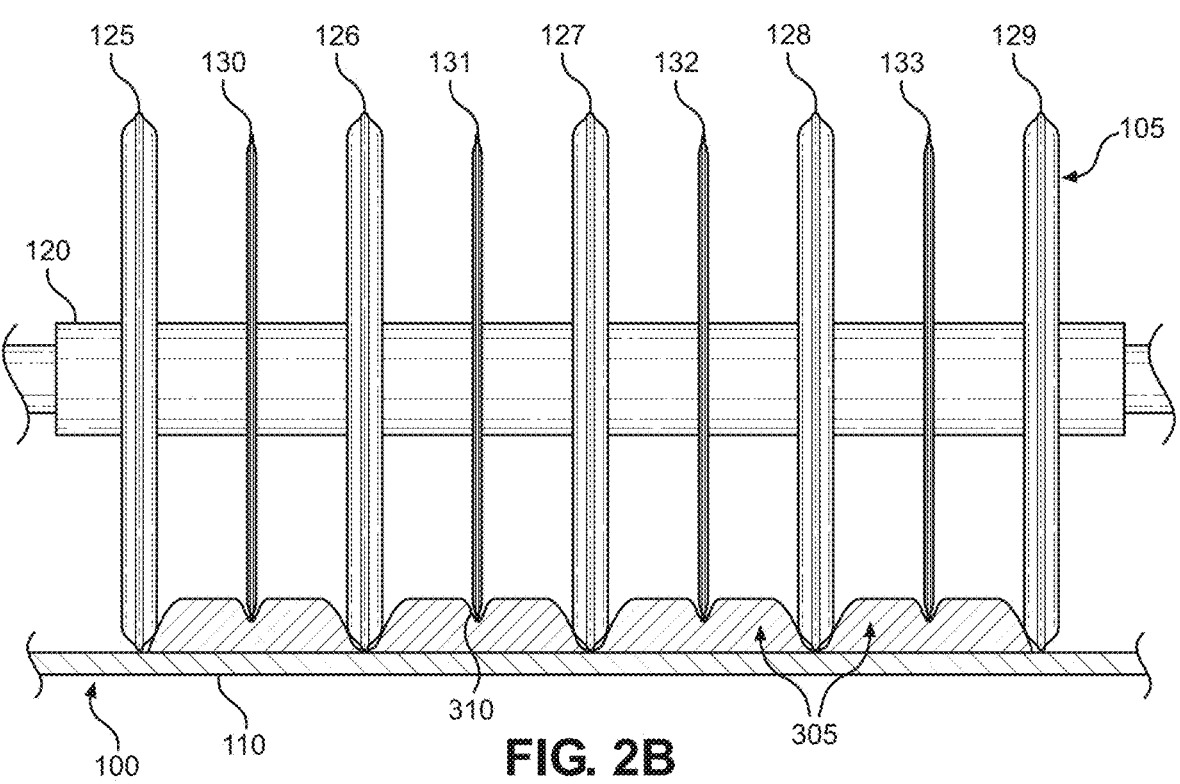
FIG. 2B is a front view of the conveyor belt and combination rotary cutter and scorer unit of the production line with a dough sheet being cut and scored.

Turning to FIGS. 2A and 2B, a front view of conveyor belt 110 and rotary cutting and scoring unit 105 is provided. That is, the views of FIGS. 2A and 2B are taken in the direction opposite direction 115. This view highlights the positioning of blades 125-129 and wheels 130-133 relative to conveyor belt 110. Specifically, blades 125-129 are positioned in contact with, or just out of contact with, conveyor belt 110 so as to cut a dough sheet traveling along conveyor belt 110 (not shown in FIG. 2A). Again, in the preferred embodiment shown, each of blades 125-129 has a blunt-edge dough engaging portion (not separately labeled) designed to stretch the upper skin of the dough sheet and cut the dough as detailed further below. On the other hand, wheels 130-133 are positioned or spaced significantly further from conveyor belt 110 so as to only press the upper skin down into a body of the dough, thereby deforming the dough sheet. To accomplish this, blades 125-129 have greater diameters than wheels 130-133. For example, wheels 130-133 have a diameter which is at least one-quarter (¼) of an inch less than blades 125-129 such that wheels 130-133 do not reach conveyor belt 110. In addition, as clearly shown, wheels 130-133 are significantly thinner than blades 125-129, generally at least half as thick, more preferably in the order of about one-third (⅓) to one-fourth (¼) the thickness.

Figure 3:
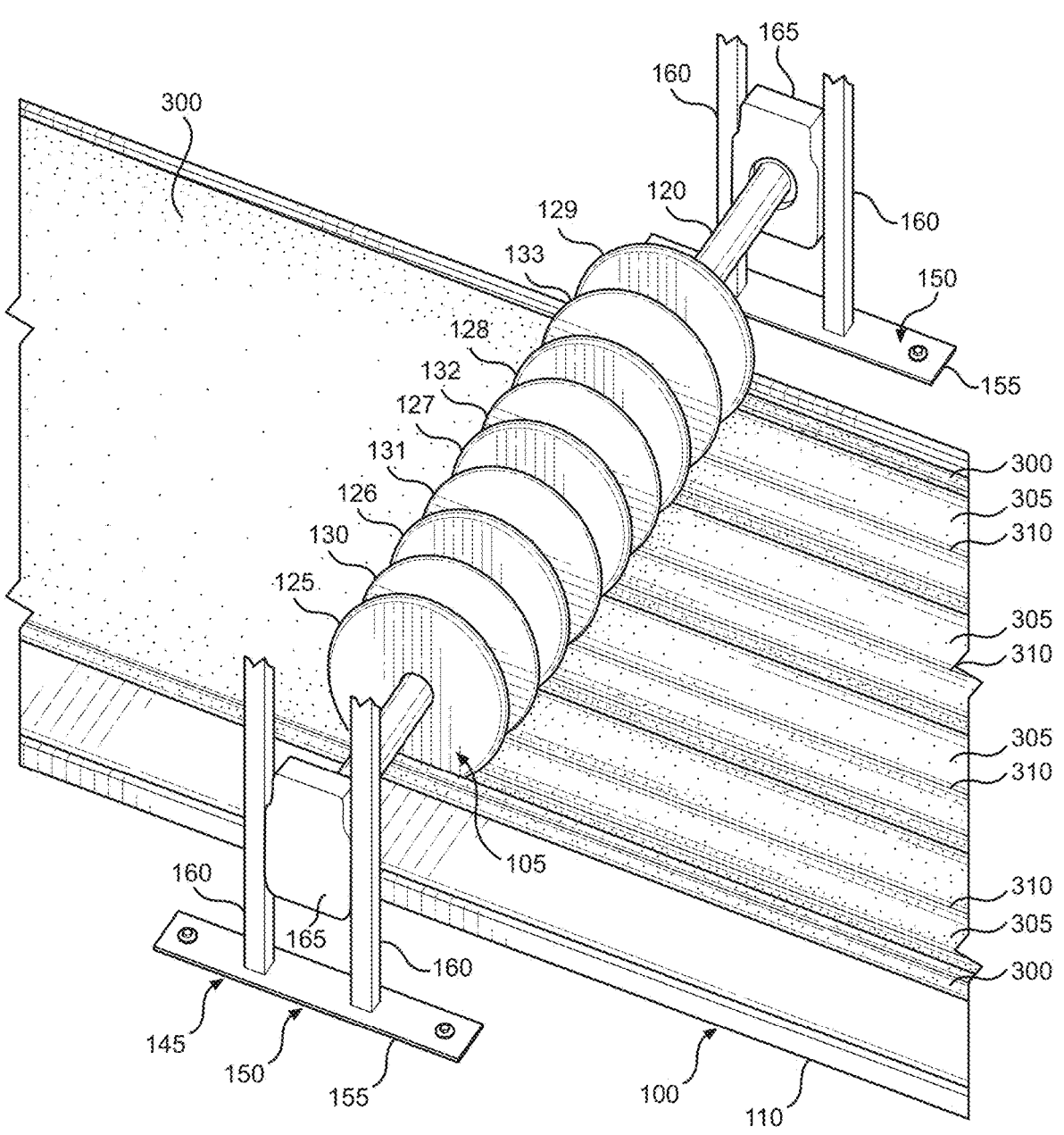
FIG. 3 is a perspective view of the portion of the production line, showing a dough sheet being cut and scored by the combination rotary cutter and scorer unit.

With reference now to FIG. 3, a dough sheet 300 has an exposed upper dough skin, a lower dough skin and a body therebetween (not separately labeled in this figure but discussed further below) supported on and transported by conveyor belt 110. Although not shown, it should be understood that the dough of dough sheet 300 is preferably formed in a batch maker or the like and then processed into dough sheet 300. Dough sheet 300 passes beneath rotary dough cutter and scoring unit 105, which is configured to continuously cut and score dough sheet 300 as dough sheet 300 is transported in direction 115. For example, FIGS. 2B and 3 show a plurality of dough strips 305, which were formed from dough sheet 300 by blades 125-129, and a plurality of scores 310, which were formed in dough strips 305 by wheels 130-133. In this exemplary embodiment, each score 310 extends parallel to a longitudinal axis of an associated dough strip 305. Later, dough strips 305 are cut crosswise (i.e., in a direction substantially parallel to driveshaft 120) to form a plurality of dough pieces.

In particular, the dough engaging portion (not separately labeled but clearly shown in FIG. 2B) of each blade 125-129, while also shaping the dough, draws the upper dough skin all the way to the lower dough skin to pinch the two skins together against the conveyor belt 110 while cutting. At the same time, first and second longitudinally extending dough strip sides (not separately labeled here but discussed further below) are formed (advantageously with rounded portions) from the upper dough skin for each dough strip or piece. Again, employing blunt-edge cutting in producing dough strips 305 is preferred but not required in accordance with the present invention. Instead, this technique is encompassed by U.S. patent application Ser. No. 16/779,886 filed Feb. 3, 2020, now U.S. Pat. No. 11,730,169 entitled "Apparatus and Method for Producing Scored Dough Pieces" which is incorporated herein by reference. However, by cutting the dough in this manner, the upper dough skin is advantageously stretched at or about the same time that wheels 130-133 score the dough, as detailed further below.

Again, important in connection with the present invention is the scores are not created by cutting or slicing of the dough. Instead, the invention can be characterized to employ blunt deformation tools for wheels 130-133 to deform the dough, either before, after or simultaneously with a dough cutting operation, to pre-stress the dough in scoring regions to establish internal weak zones in the body of the dough which open up along score lines upon cooking the dough. Here, it should be noted that the term "wheels" is employed as being distinguishing from the term "blades" used herein since wheels 130-133 are not sharp and they do not perform any cutting or slicing of the dough in connection with creating the scores. Instead, wheels 130-133, with their smaller diameters, draw or press the upper skin of the dough down to above the level of conveyor belt 110 (particularly see FIG. 2B) such that the upper skins of dough strips 305 never reach the lower skins (e.g., a quarter inch or, more preferably, less separation) due to the construction and operation of wheels 130-133. With this operation, the upper skin is pressed into the body of the dough strips 305 so as to deform the body and stress the gluten matrix of the dough to initially establish elongated deep depressions in the dough. At this point, due to the elasticity of the dough, the dough rebounds to a significant extent, while internal weak zones remain in the dough, in the form of score 310. In this sense, wheels 130-133 basically function to press the upper skins into inner body dough portions of strips 305. Interestingly, it was found that the fairly deeply drawn upper skins do rebound a significant amount but a slight elongated depression (score), established by the deformation (physical change in the internal dough structure), remains in the dough before freezing and, as will be discussed further below, opens up upon cooking of the dough.

Figure 4:
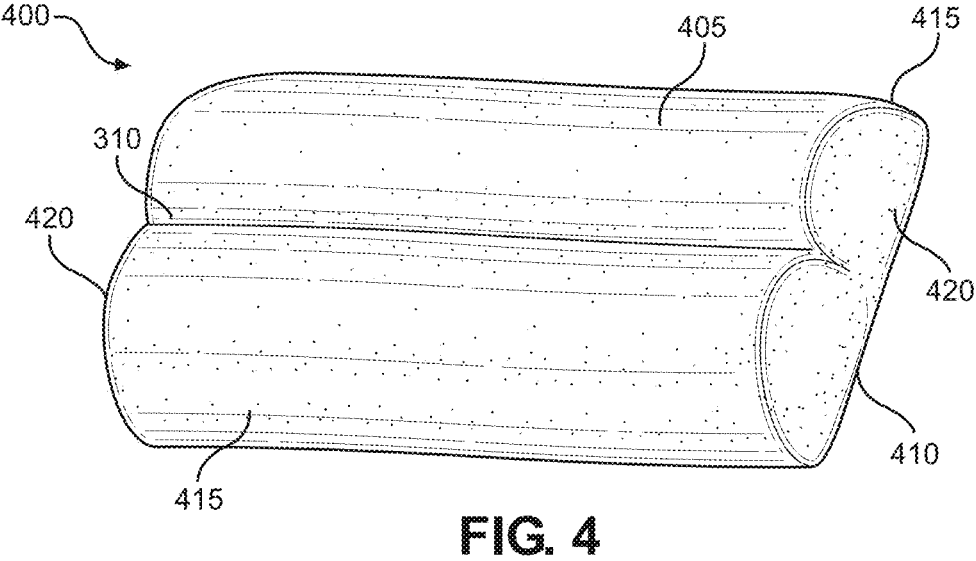
FIG. 4 is a perspective view of a dough piece formed using the production line.

One such cut dough piece which has at least partially rebounded following the scoring by deformation process of the invention is shown in FIG. 4. In particular, a dough piece 400 has an upper surface or skin 405, a lower surface or skin 410 opposite upper surface 405, opposing side surfaces 415 formed from the upper skin 405 and advantageously rounded due to the particular (blunt-edge) cutting arrangement, and opposing end surfaces 420. Score line 310 was formed in upper surface 405 by one of wheels 130-133, and side surfaces 415 were formed by two of blades 125-129. End surfaces 420 were formed by another dough cutter (not shown) when one of strips 305 was cut crosswise. This other cutter can take the form of a guillotine dough cutter, for example. At this point, it should be pointed out that employing the scoring by deformation in combination with the blunt-edge cutting has a synergistic effect. That is, the blunt-edge cutting will inherently stretch upper skin 405 such that skin 405 is even more stretched and pre-stressed upon pressing skin 405 by a respective wheel 130-133 to create the weak zones during scoring. After formation, dough piece 400 is then frozen, preferably in an un-proofed state. At this point, it should be noted that "un-proofed" in accordance with the invention means that no substantial or intentional actions are taken to promote proofing. Rather, the dough pieces are, at the very least, frozen shortly after being formed so as to save proofing for later. Once frozen, un-proofed dough piece 400 can be transported to a bakery operator, for example, who thaws, proofs, bakes and sells the resulting bread product.

Figure 5:
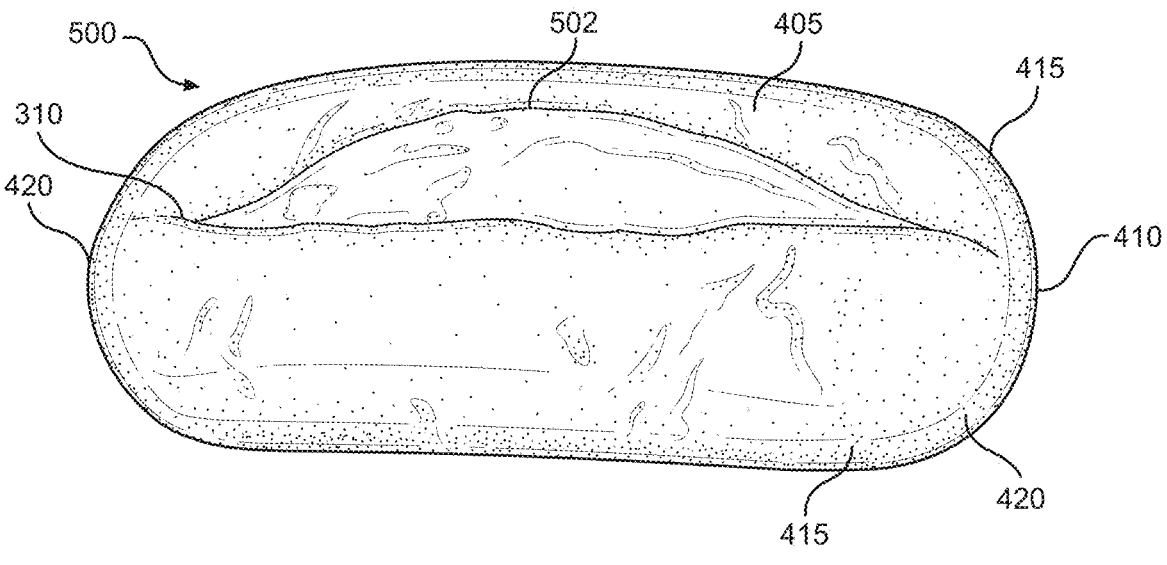
FIG. 5 is a perspective view of the dough piece after baking.

FIG. 5 shows such a bread product. Specifically, FIG. 5 shows a bread product 500, which corresponds to dough piece 400 after baking. As such, bread product 500 also has upper surface 405, lower surface 410, side surfaces 415 and end surfaces 420. In addition, score 310 can be seen near end surfaces 420. However, in the central portion of bread product 500, score 310 has opened up through bulk expansion in the weak zone, forming an opening 502. This automatically occurs during baking of dough piece 400, due to the pre-stressing of dough piece 400 during scoring, as dough piece 400 expands. In the embodiment illustrated, dough product 500 is in the form of a baguette. However, it should be recognized that other bread products can certainly be produced in accordance with the present invention. In any case, results have shown that, in accordance with the invention, a very consistent opening of the product along score 310 occurs upon baking. Therefore, the scoring by deformation is considered to be extremely advantageous to provide uniformity of the resulting products offered upon baking. In fact, the use of blunt deformation tools for scoring in accordance with the invention has been found to produce an improved visual appearance in the score area as the score opens up to a greater extent than prior cutting/slicing offerings during the baking process. This enhanced opening up of the product, e.g., baked loaf of bread, results in a greater visual contrast between the brown crust and the lighter interior of the overall product.

Figure 6:
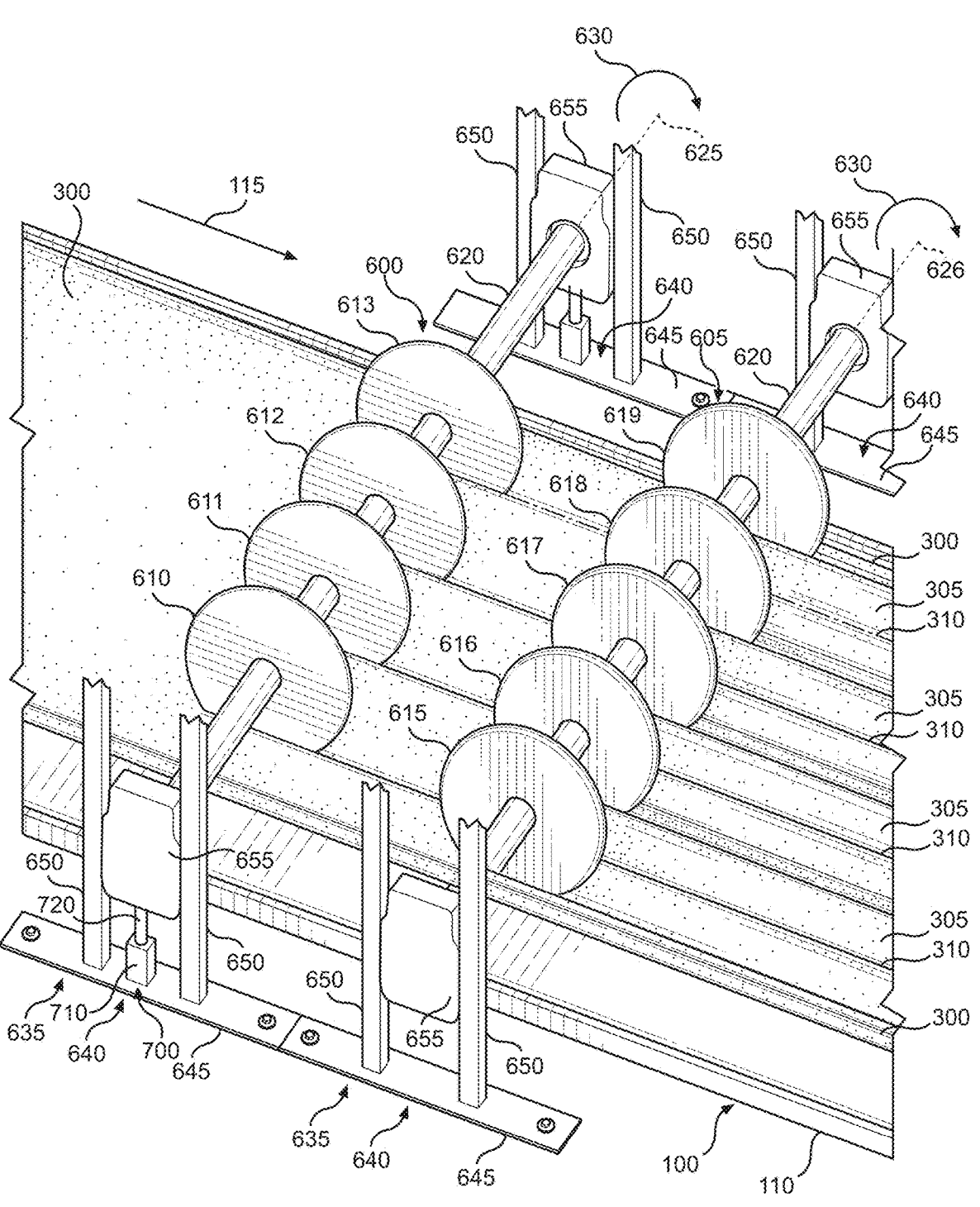
FIG. 6 is a perspective view of a portion of a second production line for producing dough pieces in accordance with the present invention.

With reference now to FIG. 6, an embodiment of the present invention is shown where scoring takes place before blunt-edge cutting. Specifically, FIG. 6 shows a portion of a production line including conveyor system 100, a rotary dough scorer 600 and a rotary dough cutter 605. Conveyor system 100 is constructed and functions in the same manner as in the embodiment of FIG. 1. That is, conveyor belt 110 of conveyor system 100 transports dough sheet 300 in direction 115 such that dough sheet 300 passes beneath rotary scorer 600 and rotary cutter 605.

Rotary scorer 600 and rotary cutter 605 are constructed similarly to combination rotary cutter and scorer unit 105 and together accomplish a corresponding objective. Essentially, rotary dough cutter and scoring unit 105 has been split into two units, with rotary scorer 600 being shown located upstream of rotary cutter 605 such that deformation scoring can take place before blunt-edge cutting. However, rotary scorer 600 could advantageously be located downstream of rotary cutter 605 so the upper skin is pre-stretched from the blunt-edge cutting prior to be scored. Certainly, if the dough was sliced along the sides, this would reduce the expansion at the score because, to at least a significant extent, expansion would occur along the side cuts. In any case, the rotary scorer 600 can be located longitudinally offset from rotary cutter 605 relative to or along the conveyor in accordance with the invention. Rotary scorer 600 includes a plurality of circular wheels 610-613, which are configured to score dough sheet 300 in a manner directly corresponding to wheels 130-133, and rotary cutter 605 includes a plurality of circular blades 615-619, which, again in this example, are preferably blunt-edge blades or cutters and are configured to cut dough sheet 300 into dough strips 305 just like blades 125-129. In the embodiment, wheels 610-613 again are smaller in size (diameter and thickness) than blades 615-619.

Each of rotary scorer 600 and rotary cutter 605 includes a driveshaft 620, 621 to which wheels 610-613 or blades 615-619 are fixedly coupled, respectively. Accordingly, rotation of driveshafts 620 and 621 results in rotation of wheels 610-613 and blades 615-619. Driveshafts 620 and 621 are aligned perpendicular to direction 115. Therefore, the axes of rotation for rotary scorer 600 and rotary cutter 605 (labeled 625 and 626, respectively) are also aligned perpendicular to direction 115. As described above, rotary cutter 605 can be configured such that contact with conveyor belt 110 or dough sheet 300 causes rotary cutter 605 to rotate in a direction 630 as conveyor belt 110 travels in direction 115. Alternatively, rotary cutter 605 can be driven using one or more motors. In the case of rotary scorer 600 of this embodiment, shaft 620 is positively driven to rotate as detailed further below.

Each of rotary scorer 600 and rotary cutter 605 is supported above conveyor belt 110 by a support structure 635. The details of support structures 635 are not important to the present invention. However, it can be seen that each support structure 635 includes identical left and right supports 640. Each support 640 has a base 645 and a pair of columns 650, which support a housing 655 receiving the ends of driveshafts 620 and 621. If one or more motors are employed, the same would be located in a respective housing 655, which in the case for at least the driveshaft 621 of rotary scorer 600.

Like rotary cutter 105, rotary scorer 600 and rotary cutter 605 are used in the production of scored dough pieces, such as dough piece 400, where the scores create weak zones which remain through freezing, thawing and proofing, but which cause the bread dough to open up along the score line upon heating. Both embodiments achieve this goal by combining the cutting of the bread dough with deformation and pre-stressing. Again, the scoring deforms the dough in such a way that the score remains intact during later production steps and all the way to receipt of the bread dough by end users. That is, the score remains intact through any partial proofing and freezing by the producer, as well as both thawing and proofing by the end user. However, upon being heated, such as by an end user, the bread dough opens up along the score line to create opening 504.

By offsetting driveshafts 620 and 621, it becomes possible to provide for vertically shifting of at least rotary scorer 600. By way of example, an actuator 700 can be positioned between base 645 and each housing 655 for this purpose. In the case of a linear actuator, a cylinder 710 can be mounted on base 645 and a piston rod 720 can extend to housing 655, with columns 650 guiding housing 655 for selective vertical movement relative to conveyor belt 110. This arrangement advantageously enables more precise control of the depth of each of the scores into the body of the dough, thereby accommodating varying dough thicknesses and formulations. Furthermore, the raising and lowering of rotary scorer 600 (i.e., wheels 610-613) provides for the ability to create discontinuous score lines in the dough strips. Of course, the invention is not limited to the use of symmetrical or circular deformation tools forming just one or more elongated linear scores per dough piece, but rather other deformation scoring tools can also be employed.

As indicated above, performing the scoring operation downstream of the cutting operation advantageously provides for additional pre-stretching and pre-stressing the upper skin prior to the further stressing upon deformation scoring of the dough. Again, when scoring through deformation in accordance with the invention, the upper skin is pressed into the body of the dough strips so as to deform the body and stress the gluten matrix of the dough to initially establish elongated deep depressions in the dough. Due to the elasticity of the dough, the dough rebounds to a significant extent, while internal weak zones remain in the dough, in the form of the score. Simply stated, these zones are further weakened when the dough is pre-stressed through the initial cutting operation, thereby resulting in enhanced opening up of the product upon baking. In addition, the score line(s) opening up later in the baking process advantageously assures a significant greater visual contrast between the brown crust and the lighter interior of the overall product.

Figure 7:
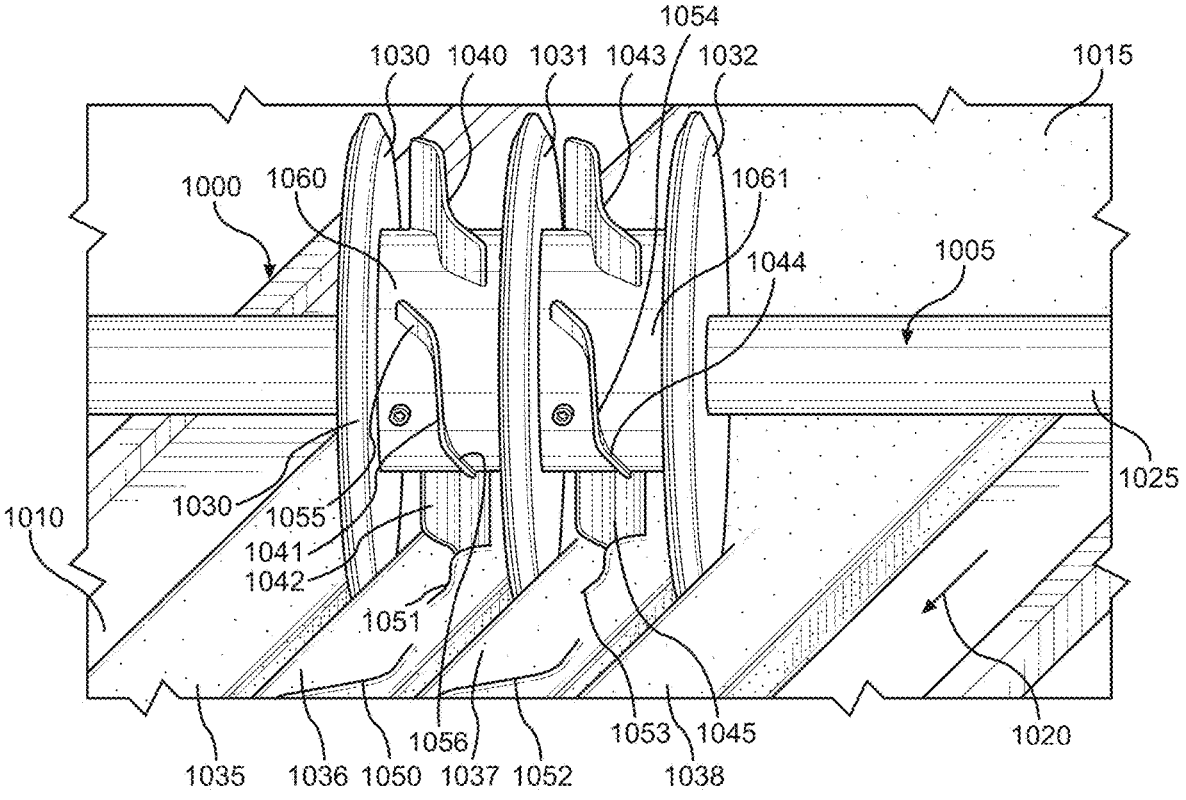
FIG. 7 is a perspective view of a portion of a third production line for producing dough pieces in accordance with the invention.

It has also been found that different scoring techniques can be used to further enhance the pre-stressing of the dough and desired the visual contrast. To this end, attention is directed to FIG. 7 where scoring and blunt-edge cutting take place simultaneously to form angles or crosswise scores in the dough. Specifically, FIG. 7 shows a portion of a production line including a conveyor system 1000 and a rotary dough cutter 1005. Conveyor system 1000 includes a conveyor belt 1010 for supporting and transporting a dough sheet 1015. Conveyor belt 1010 passes beneath rotary cutter 1005 while traveling in a direction 1020. Certainly, as with the other embodiments set forth above, other conveyor systems known in the art can be used with the present invention.

Rotary cutter 1005 includes a driveshaft 1025 and a plurality of circular blades 1030-1032. Driveshaft 1025 is aligned perpendicular to direction 1020. Accordingly, the axis of rotation for rotary cutter 1005 is also aligned perpendicular to direction 1020. Rotary cutter 1005 is configured such that contact between rotary cutter 1005 and conveyor belt 1010 or dough sheet 1015 causes rotary cutter 1005 to rotate as conveyor belt 1010 travels in direction 1020. Alternatively, a motor and transmission (not shown) can be provided for driving rotary cutter 1005, i.e., for causing rotary cutter 1005 to rotate.

Blades 1030-1032 are fixedly coupled to driveshaft 1025 such that rotation of driveshaft 1025 results in rotation of blades 1030-1032. Each of blades 1030-133 is configured to cut dough sheet 1015 as dough sheet 1015 is being transported by conveyor belt 1010. Specifically, blades 1030-1032 are blunt-edge blades and are configured to cut dough sheet 1015 into dough strips 1035-1038 through an upper skin to lower skin pinching operation. Later, dough strips 1036 and 1037 are cut crosswise (i.e., in a direction parallel to driveshaft 1025) to form a plurality of dough pieces.

As with the earlier embodiments, the embodiment of FIG. 7 can be modified such that scoring takes place before or after blunt-edge cutting (rather than simultaneously). As described above, pre-stressing advantages are achieved when blades 1040-1045 are mounted to another driveshaft downstream from driveshaft 1025. This embodiment particularly differs from the other embodiments described above in that non-circular blades are used for the scoring. In particular, rotary cutter 1005 includes deformation causing blades 1040-1045 which are configured to score dough sheet 1015. For example, scores 1051-1053 can be seen in dough strips 1036 and 1037. Blades 1040-1045 are fixedly coupled to driveshaft 1025 using mounting holes (not separately labeled) formed in collars 1060 and 1061. Although not visible in FIG. 7, it should be recognized that non-circular blades extend all the way around collars 1060 and 1061 to continuously score dough strips 1036 and 1037 as dough sheet 1015 travels in direction 1020.

Particularly important in connection with blades 1040-1045 is the configuration thereof. More specifically, each blade 1040-1045 includes a central portion 1054, which extends substantially linearly either generally parallel to or at an acute angle to direction 1020, and end portions 1055 and 1056 which are not aligned with central portion 1054. Basically, end portions 1055 and 1056 are oppositely angled or curved relative to central portion 1054. In the particular embodiment depicted, each blade 1040-1045 is shown to generally take a mirror image S-shape, but other shapes, such as a mirror image Z-shape, or non-mirror image versions, could be employed, particularly with end portions which extend in opposite directions, such as in mirror image fashion, away from each other. In addition, the central portion 1054 of each blade 1040-1045 could be angled to direction 1020. In any case, the use of the angled or curved end portions 1055 and 1056 relative to central portion 1054 further add to the pre-stressing desired in accordance with the invention. In particular, it has been found that scores created in this manner tend to open later during baking, with the opening along the scores being initially resisted, such as through twisting or torquing forces created by the existence of the angled or curved end portions 1055 and 1056. As mentioned above, this delayed opening advantageously enhances the visual contrast between the brown crust and the lighter interior of the finished product.

Figure 8:
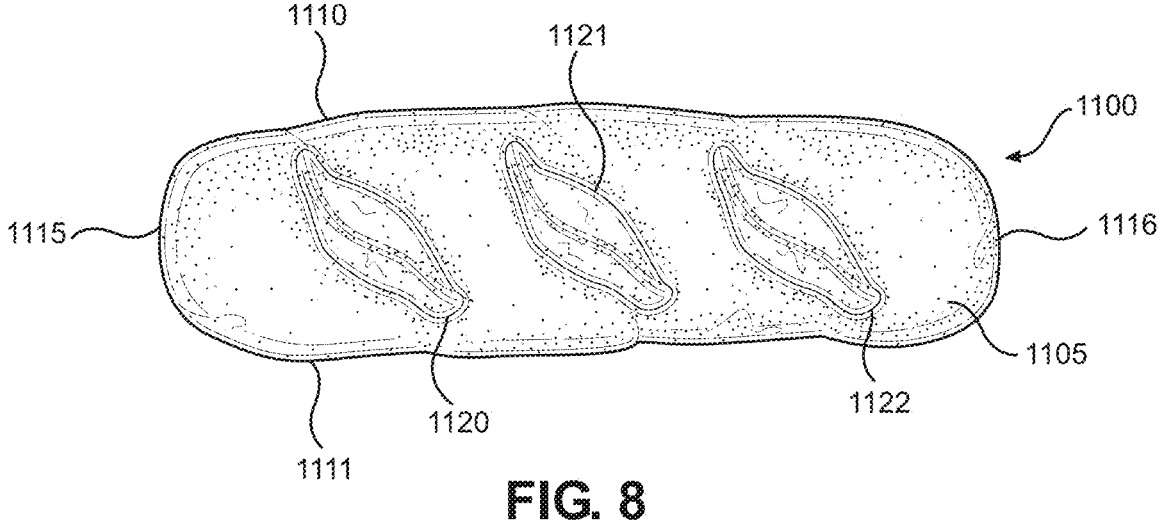
FIG. 8 is a top view of a baked dough product made employing the third production line of FIG. 7.
Figure 9:
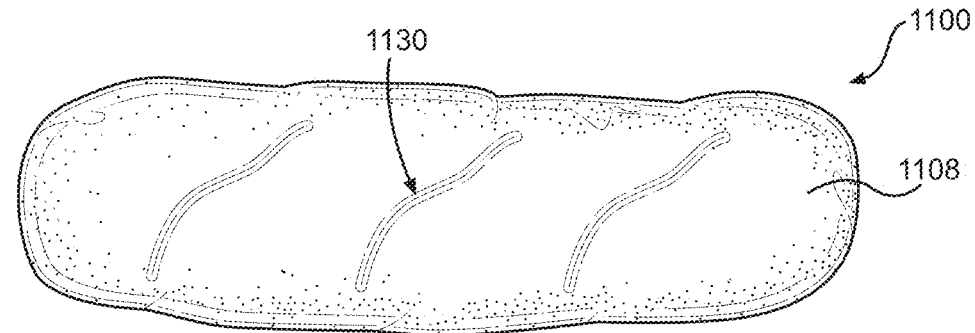
FIG. 9 is a bottom view of the baked dough product of FIG. 8.

FIGS. 8 and 9 illustrate a bread product 1100 produced by baking one of the dough pieces formed using the embodiment of FIG. 7. Bread product 1100 having an elongated body (not separately labeled) with an upper surface or skin 1105, a lower surface or skin 1108 (FIG. 9) opposite upper surface 1105, opposing side surfaces 1110 and 1111 connecting upper surface 1105 and the lower surface 1108, and opposing end surfaces 1115 and 1116. Upon baking, score openings 1120-1122 are created in upper surface 1105 along scores 1050-1053 made by three of blades 1040-1045, and side surfaces 1110, 1111 are formed by two of blades 1030-1032. End surfaces 1115 and 1116 are formed by one or more other dough cutters (not shown) when the strips 1036 and 1037 are cut crosswise.

As compared with scores 1050-1053 which are visible in FIG. 7, score openings 1120-1122 develop during baking of the dough piece that became bread product 1100 as the dough piece is expanded. The configuration of blades 1040-1045 advantageously enhances the degree of opening of score openings 1120-1122, with a twisting or torquing operation occurring based on the inclusion of the angled or curved end portions 1055 and 1056 in combination with the linear central portion 1055. Overall, creating the scores as lines of weakness in the dough, instead of actually cutting or slicing the dough, establishes the desired surface tension before proofing. Upon baking when the inelastic crust forms, tearing occurs along the score lines, causing the product to split and open at scores 1120-1122 without time to form a crust at these locations. Therefore, as desired for such bread products, the bread at scores 1120-1122 is substantially lighter in color than the rest of the exterior of bread product 1100. In particular, the bread in scores 1120-1122 is preferably much closer in color to the interior of bread product 1100 than to the rest of the exterior surface of bread product 1100 due to the added pre-stressing and delayed opening during the baking process. The depth of scores 1050-1053 is controlled (as mentioned above) or at least predetermined to assure that the dough matrix is altered. The most beneficial depth depends on the thickness of the dough sheet but it has been found that minimizing the separation between the upper skin and the lower skin, while assuring that the scoring does not go through the lower skin, is desirable. In general, this separation is typically in the range of ¼ to ⅛ of an inch, but could be even less. By way of example, the depth is particularly effective at approximately ⅛ inch to the belt on a dough sheet of approximately 1½ inches thick. However, given varying dough sheet thicknesses due to a range of products that can be produced, it can at least be said that the most preferred scoring depth at least leaves an identifiable indication or mark on bottom surface 1108, as represented in FIG. 9 at 1130, again without perforating, puncturing or cutting bottom surface 1108 in any manner. This scoring indication is actually visible in bottom surface 1108 before baking, when the dough product is frozen before baking, and after baking.

Based on the above, it should be recognized that, in accordance with the present invention, mass production with deformation scoring of an un-proofed dough with at least one blunt deformation tool prior to freezing advantageously results in later thawed, proofed and baked dough pieces which are more uniform in functional and aesthetic attributes comparable to dough products scored after proofing such that the present invention provides pre-stressed, scored dough pieces where the score remains intact through freezing, thawing and proofing, as well as apparatuses and methods for producing the scored dough pieces. While certain preferred embodiments of the present invention have been set forth, it should be understood that various changes or modifications could be made without departing from the spirit of the present invention. As emphasized above, employing a blunt deformation tool having end portions which are angled, curved or generally not aligned with a central portion of the tool further enhances the pre-stressing and resulting product, more particularly when the scoring is performed downstream of the strip cutting operation. Although rotary deformation tools have been disclosed, reciprocal stamping operations could be employed. In general, the invention is only intended to be limited by the scope of the following claims.

The invention claimed is:

1. A method for producing frozen un-proofed dough pieces with scores, the method comprising:

transporting an un-proofed dough as a dough sheet with a conveyor, the dough having a body, a lower skin in contact with the conveyor and an upper skin opposite the lower skin;

cutting the dough with a plurality of blades configured to cut the dough into a plurality of dough strips;

scoring the dough using a blunt deformation tool to produce a functional score for each of the plurality of dough strips by drawing the upper skin into the body to a depth above the lower skin while deforming and pre-stressing the body, without cutting the dough, wherein the one blunt deformation tool has end portions which are angled or curved relative to a central portion of the tool; and cutting the plurality of dough strips to form dough pieces each having one of the functional scores configured to open during baking of the dough pieces.

2. The method of claim 1, wherein the upper skin is drawn to within no greater than ¼ of an inch of the lower skin.

3. The method of claim 2, wherein the upper skin is drawn to within no greater than ⅛ of an inch of the lower skin.

4. The method of claim 1, wherein the plurality of blades employed for cutting the dough sheet constitute blunt-edge cutters, each having a dough engaging portion configured to press the upper skin toward the lower skin to pinch the upper and lower skins together while cutting to form first and second dough strip sides for each of the plurality of dough strips.

5. The method of claim 1, wherein the deformation tool configured to produce a score is a wheel mounted on a first driveshaft, each of the plurality of blades configured to cut the dough sheet is a circular cutter mounted on a second driveshaft, and the first driveshaft is located offset from the second driveshaft along the conveyor.

6. The method of claim 5, further comprising vertically adjusting the first driveshaft relative to the conveyor to establish the depth.

7. The method of claim 6, wherein the second driveshaft is located upstream of the first driveshaft.

8. The method of claim 1, wherein the central portion of the blunt deformation tool extends generally parallel to a longitudinal axis of a respective one of the plurality of dough strips.

9. The method of claim 8, wherein the end portions of the blunt deformation tool extend in generally opposite or mirror image fashion from the central portion.

10. The method of claim 1, further comprising:

allowing the dough to rebound from the scoring; and freezing the dough after the dough rebounds.

11. The method of claim 1, wherein, each of the dough pieces further comprises:

an upper surface formed with the upper skin, a lower surface formed with the lower skin, end portions and side portions, with at least the side portions being defined by the upper skin of the upper surface pinched to the lower skin of the lower surface, with the functional score defined by the upper skin extending into the into the body to a depth above the lower skin such that the body is deformed without being cut and wherein the body is elongated.

12. A production line for producing un-proofed dough pieces with scores, the production line comprising:

a conveyor configured to transport dough having a lower skin for contacting the conveyor, an upper skin opposite the lower skin and a body between the upper and lower skins;

at least one cutting blade configured to cut the dough into a plurality of dough strips;

at least one blunt deformation tool, having end portions which are angled, curved or generally not aligned with a central portion of the tool, configured to produce a functional score the dough by drawing the upper skin into the body to a depth above the lower skin while deforming the body without cutting the dough; and a cutting device configured to cut the plurality of dough strips to form a plurality of dough pieces.

13. The production line of claim 12, wherein the at least one blunt deformation tool is configured to draw the upper skin to within no greater than ¼ of an inch of the lower skin.

14. The production line of claim 13, wherein the at least one blunt deformation tool is configured to draw the upper skin to within no greater than ⅛ of an inch of the lower skin.

15. The production line of claim 12, further including a first driveshaft and a second driveshaft, wherein the at least one blunt deformation tool comprises a plurality of wheels mounted on the first driveshaft, the at least one cutting blade comprises a plurality of circular cutting blades mounted on the second driveshaft, and the first driveshaft is located offset from the second driveshaft along the conveyor.

16. The production line of claim 15, further comprising a lift device configured to selectively vertically adjust the first driveshaft relative to the conveyor.

17. The production line of claim 15, wherein the second driveshaft is located upstream of the first driveshaft.

18. The production line of claim 12, wherein the central portion of the at least one blunt deformation tool is configured to extend substantially parallel to a direction of travel of the conveyor.

19. The production line of claim 18, wherein the end portions of the at least one blunt deformation tool extend in generally opposite or mirror image fashion from the central portion.

* * * * *